United States Patent [19]

Bryan

[11] Patent Number: 5,267,287
[45] Date of Patent: Nov. 30, 1993

[54] HOLDDOWN LEAF SPRING ASSEMBLY HAVING A LUBRICANT COATING

[75] Inventor: William J. Bryan, Granby, Conn.
[73] Assignee: Combustion Engineering, Inc., Windsor, Conn.
[21] Appl. No.: 951,092
[22] Filed: Sep. 25, 1992
[51] Int. Cl.$^5$ .................................. G21C 3/30
[52] U.S. Cl. ........................ 376/364; 376/285; 376/415
[58] Field of Search ............ 376/364, 362, 285, 445, 376/448, 434, 415, 261, 260

[56] References Cited

U.S. PATENT DOCUMENTS 4,710,343 12/1987 Christiansen et al. ............... 376/414
5,053,191 10/1991 Bryan et al. ........................... 376/364

Primary Examiner—Daniel D. Wasil
Attorney, Agent, or Firm—L. James Ristas; John H. Mulholland

[57] ABSTRACT

In a method for fabricating an end fitting (12,200) for a nuclear fuel assembly (10), wherein the end fitting includes at least one spring member (24,202) having an active external surface (32,206) for contacting rigid core support structure (100) in the nuclear reactor, the improvement comprising applying a coating to the active surface of the spring member. The coating is selected from the group consisting of nitrides, Cr, TiC, CrC, ZrC and NiTaB. The spring member is preferably Inconel and the coating is one of ZrN or TiN. Each spring member can be formed by nesting a plurality of spring elements (28,34,36 or 208,210) so that the spring elements are in contact with each other and the method includes applying said coating to each of the spring elements at least where they contact each other.

17 Claims, 2 Drawing Sheets

HOLDDOWN LEAF SPRING ASSEMBLY HAVING A LUBRICANT COATING

BACKGROUND OF THE INVENTION

This invention relates to nuclear reactor fuel assemblies and in particular to assemblies which are mounted side by side in a reactor core.

The fuel rods of each assembly are held by spacer grids between an upper end fitting or top nozzle and a lower end fitting or bottom nozzle. The reactor coolant flows upwardly from holes in the lower end fitting along the fuel rods, and upwardly through holes in the upper end fitting.

When the fuel assembly is loaded in a reactor core, an upper core plate over the fuel assembly reacts against fuel assembly holddown spring members on the upper end fitting, to provide a downward force. This force combines with the fuel assembly weight to prevent fuel assembly liftoff from hydraulic forces during operation of the reactor pumps.

The holddown spring members are exposed to the high pressure and temperature of the circulating coolant. They experience flexure while accommodating relative movement between the fuel assemblies and the support plate, and they experience some friction at the active surface which is in contact with the core support plate or when stacked with each other. This friction can have two adverse consequences. First, the spring coefficient can be affected if the point of contact of the spring active surface against the support plate or each other, cannot adjust as the spring flexes. Secondly, and perhaps more importantly, friction can produce wear of the upper core plate and spring which can affect the available spring force and the integrity of the spring member itself.

SUMMARY OF THE INVENTION

It is, accordingly, an object of the present invention to increase the lubricity of the contact surfaces between the spring members on the end fittings of nuclear fuel assemblies, and the core support plates in a nuclear reactor.

According to one embodiment, the invention is directed to a method for fabricating an end fitting for a nuclear fuel assembly, wherein the spring members of the end fitting are coated, at least on the active external surface which contact the core support plate, with a lubricity-enhancing material. Suitable materials include a variety of nitrides, and Cr, TiC, CrC, ZrC, and NiTaB.

In the apparatus embodiment, the invention is directed to a nuclear reactor having a substantially horizontally oriented core support plate and a plurality of nuclear fuel assemblies each having at least one spring member bearing against the support plate, wherein the spring members include a metallic coating to reduce friction at the bearing surface of the spring member against the support plate. Preferably, the support plate is stainless steel, the spring member is Inconel, and the coating on the spring member, is one of ZrN or TiN.

The spring members in some types of conventional upper end fittings, are composed of a plurality of nested, cantilevered spring elements. Preferably, the coating is applied not only to the upper spring element, which contacts the support plate, but also to the other spring elements which are in contact with each other and the upper spring element. This reduces friction and wear within the spring member, thereby also maintaining a predictable spring rate and avoiding excessive wear and corrosion.

BRIEF DESCRIPTION OF THE DRAWINGS

These and other objects and advantages of the invention will be described below with reference to the accompanying drawings, in which.

DESCRIPTION OF THE PREFERRED EMBODIMENT

Figure 1:
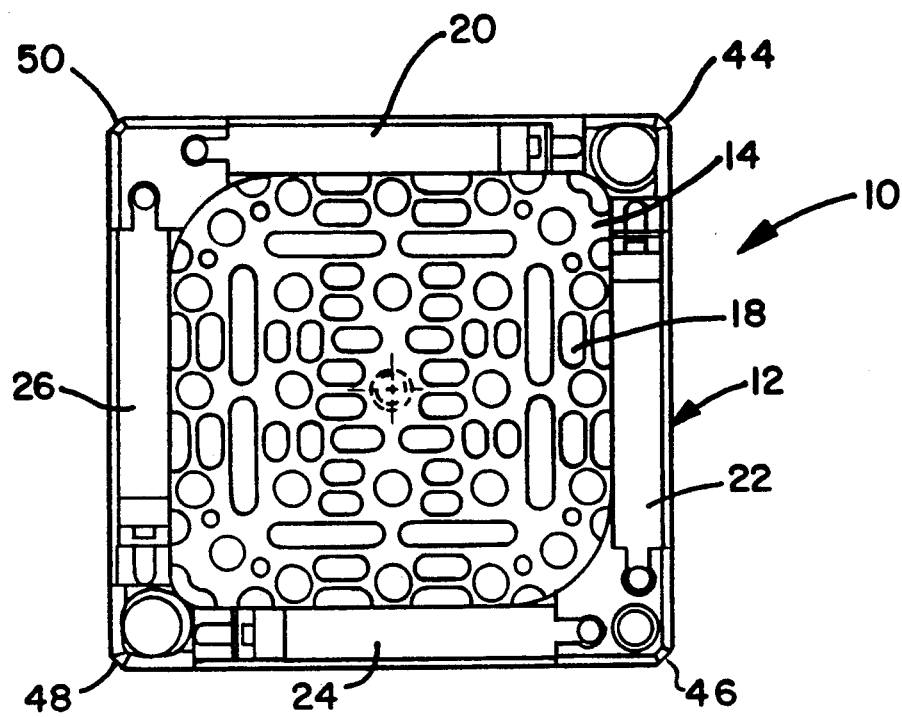
FIG. 1 is a plan view of the upper end fitting of one type of known nuclear fuel assembly.

FIG. 1 is a plan view of a nuclear fuel assembly 10, in which only the upper end fitting 12 is visible. The upper portion of the fuel assembly 10 is shown in elevation in FIG. 2, immediately below, and spaced from, a horizontally oriented upper core support plate 100. As would be found in a nuclear reactor core. In the reactor core, a plurality of the vertically oriented fuel assemblies are positioned in side by side relationship. After all the fuel assemblies are in place, the upper core support plate 100 is lowered on to all of the assemblies, substantially simultaneously.

Figure 2:
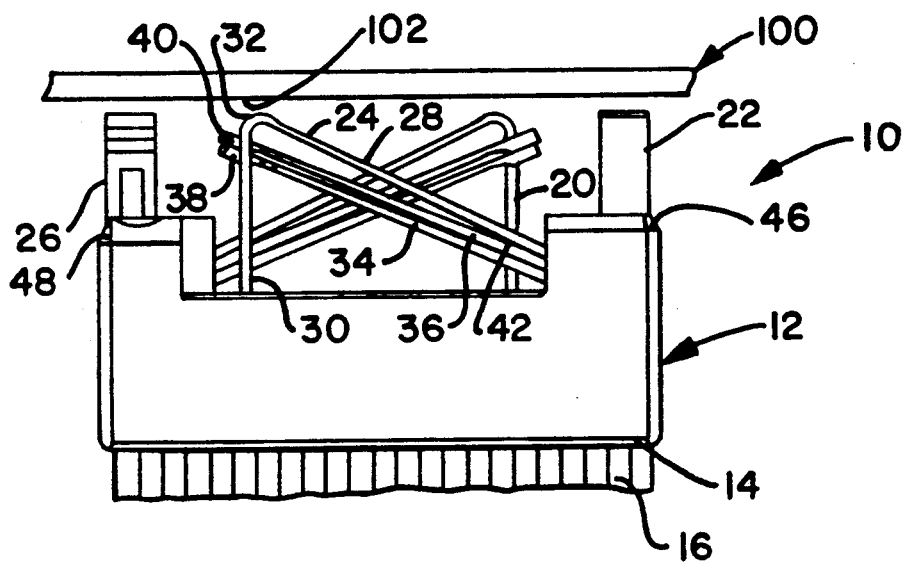
FIG. 2 is an elevation view of the upper portion of the fuel assembly of FIG. 1, showing the relationship of the upper core support plate as it is being lower onto the spring members of the fuel assembly upper end fitting.

Each fuel assembly has a multiplicity of nuclear fuel rods 16 which are connected to the base 14 of the upper end fitting 12. The base includes a plurality of holes 18 by which reactor coolant passes into and through the upper end fitting 12, from the flow channels between the fuel rod 16. The upper end fitting in one conventional arrangement as shown in FIGS. 1 and 2, includes four spring packs or members 20, 22, 24, and 26, each of which extends along one respective side of the substantially square end fitting perimeter. In the illustrated embodiment, spring member 20 is situated between corners 50 and 44, spring member 22 between corners 44 and 46, spring member 24 between corners 46 and 48, and spring member 26 between corners 48 and 50. The spring members project upwardly to define the upper limit of the fuel assembly.

Each spring member, such as 24 shown in FIG. 2, includes a rigidly supported portion 28, and a free end 30, between which an active portion or surface 32 is adapted to contact and bear against the support plate 102. In other words, as the support plate 100 is lowered onto the fuel assemblies, contact is made between the surface 102 of the plate 100 and the portion 32 of each spring such as 24, whereby the spring members are simultaneously loaded. The support plate 100 is then rigidly secured to the reactor vessel (not shown), such that all the fuel assemblies are resiliently supported during reactor operation.

In the embodiment shown in FIGS. 1 and 2, each spring member 24 is cantilevered. Moreover, it is preferred that each spring member 24 include a plurality of nested, cantilevered spring elements including elements 34 and 36. Spring elements 34 and 36 are rigidly connected at one end to spring portion 28 and these are attached near the corner 46 of the end fitting. At their free ends, elements 34 and 36 have openings 38, 40 through which the free end 30 of the main spring element passes substantially vertically. It should be appreciated that as the plate 100 is lowered onto bearing surface 32, and during flexure of the spring member 24 in operation, the interaction between surfaces 32 and 102, and the mutual points of contact among the spring element such as shown at 42, have a sliding e.g., horizontal, component. This friction not only affects the spring rate, but, particularly where vibratory forces on the fuel assembly are manifested at the spring contact surfaces, can give rise to excessive wear and corrosion.

This can pose a problem even when inherently corrosion resistant materials are used for the springs and core support plate. For example, it is typical that the elements of spring member 24 are made from Inconel, e.g., Inconel 718, whereas the core support plate 100 is made from stainless steel. Nevertheless, according to the present invention, there is achieved an enhanced lubricity between each spring member such as 24, against the core support plate 100, and preferably, between the spring elements such as 34, 36, and 28, of a given spring member such as 24.

This enhanced lubricity is accomplished by coating at least the active, bearing surface 32 of the spring member, with a smooth metallic material. Metal nitrides, particularly ZrN and TiN, are especially effective. Tests on representative samples for the interaction of these nitride coatings on Inconel 718 show significant enhancement of desirable characteristics.

TABLE 1

Properties of Nitride Coated Inconel 718

| Property | ZrN | TiN |
|---|---|---|
| Microhardness (Kg/mm$^2$) (50 g load) | 2,895 | 2,575 |
| Surface Roughness (rms) (um) | 0.12 | 0.38 |
| Coefficient of Friction | 0.020 | 0.035 |

The wear rate of Inconel 718 is reduced by a factor of six, and more importantly for the present invention, the frictional force between the coated spring and the stainless steel core plate, is reduced by about a factor of eight. These data are base on coating Inconel 718 samples using a cathodic vacuum arc plasma deposition process as described, for example, in the article "Cathodic Arc Deposition Advances in Coating Technology", P.C. Johnson, *Research and Development*, February, 1987. It should be appreciated, however, that other coating processes may be employed to achieve the advantages within the scope of the present invention. Although a given process may be more convenient or cost effective than another, the novelty of coating the spring members on the end fittings of nuclear fuel assemblies, to enhance lubricity, is not dependent on the particular process selected.

Other coating materials which can provide significant improvement relative to the current practice of using uncoated spring members, include the metal nitrides CrN, HfN, TiAlVN, TaN, and TICN. In addition, other suitable coatings include Cr, TiC, CrC, ZrC, and NiTaB.

Although, as a minimum, the bearing surface such as 32 as shown in FIG. 2, is enhanced by means of the coating, alternatively the entire external surface of the spring member 24, or of each of the spring elements constituting the spring member, can be coated. This enhances lubricity at the contact surfaces, and reduces the risk of corrosion at any other spring member surface.

Figure 3:
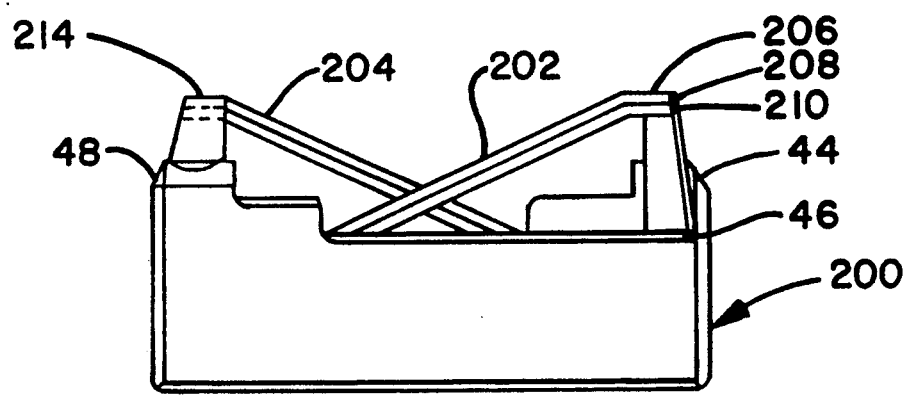
FIG. 3 is an elevation view similar to FIG. 2, showing an alternative upper end fitting.

FIG. 3 illustrates another upper end fitting embodiment 200, in which two leaf spring members 202, 204, perform the same function as the four cantilever spring members of the embodiment shown in FIGS. 1 and 2. The leaf spring member 202 is rigidly connected near corners 48 and 44, with the apex 206 substantially above corner 46. Similarly, spring member 204 is rigidly connected at its ends near corners 44 and 48, with the apex 214 substantially above the corner (not shown) opposite corner 46. The leaf spring member such as 202,, is preferably formed from two nested leaf spring elements 208, and 210. The bearing surface 206 at the apex is adapted to contact the upper core support plate, deflect when loaded, and experience flexure during operation, in a manner analogous to that described above with respect to spring member 24. The leaf spring embodiment shown in FIG. 3, has a greater contact surface between the respective spring elements 208, and 210, and therefore would benefit significantly from the enhanced lubricity on the full exterior surfaces of each spring element, in accordance with the present invention.

I claim:

1. In a method for fabricating an end fitting for a nuclear fuel assembly, wherein the end fitting includes at least one spring member having an active external surface for contacting rigid core support structure in the nuclear reactor, the improvement comprising: applying a coating to the active surface of said spring member, said coating selected from the group consisting of nitrides, Cr, TiC, CrC, ZrC and NiTaB.

2. The method of claim 1, wherein the spring member is Inconel and the coating is one of ZrN or TiN.

3. The method of claim 1, wherein the coating is applied by vacuum are plasma deposition.

4. The method of claim 1, wherein the coating is one of ZrN or TiN.

5. The method of claim 1, wherein the coating is applied to substantially the entire external surface of said spring member.

6. The method of claim 1, wherein each spring member is formed by nesting a plurality of spring elements so that the spring elements are in contact with each other and the method includes applying said coating to each of the spring elements where they contact each other.

7. A nuclear reactor having a substantially horizontally oriented core support plate and a plurality of substantially vertical nuclear fuel assemblies, each resiliently supported by at least one spring member having a bearing surface projecting from an end fitting on the assembly against the support plate, wherein the improvement comprises said spring members including a metallic coating to lubricate the bearing surface of the spring element against the support plate.

8. The nuclear reactor of claim 7, wherein
   each spring member includes a plurality of nested spring elements which have contact surfaces that rub against each other as the spring member resiliently bears against the support plate, and
   each spring member includes a nitride coating at least on said contact surfaces that rub against each other.

9. The nuclear reactor of claim 7,
   wherein the metallic coating is a nitride.

10. The nuclear reactor of claim 9, wherein the metallic coating is one of ZrN or TiN.

11. The nuclear reactor of claim 9, wherein the metallic coating is selected from the group consisting of CrN, HfN, TiAlVN, TaN and TiCN.

12. The nuclear reactor of claim 7, wherein the coating is selected from the group consisting of Cr, TiC, CrC, ZrC and NiTaB.

13. The nuclear reactor of claim 7, wherein substantially the entire external surface of each spring member is coated.

14. The nuclear reactor of claim 7, wherein the spring member is Inconel and the support plate is stainless steel.

15. The nuclear reactor of claim 8 wherein the spring elements are Inconel and the support plate is stainless steel.

16. In an upper end fitting for a nuclear fuel assembly of the type having upwardly projecting spring members for interacting with a core upper support plate, the improvement comprising said spring members being coated with a lubricity-enhancing material.

17. The end fitting of claim 16, wherein the spring member is Inconel and the coating material is a metal nitride.

* * * * *